United States Patent [19]

Tsukiji

[11] Patent Number: 4,717,163
[45] Date of Patent: Jan. 5, 1988

[54] FUEL TANK FOR STRADDLED TYPE VEHICLES

[75] Inventor: Kensuke Tsukiji, Asaka, Japan

[73] Assignee: Honda Giken Kogyo Kabushiki Kaisha, Tokyo, Japan

[21] Appl. No.: 27,052

[22] Filed: Mar. 23, 1987

Related U.S. Application Data

[63] Continuation of Ser. No. 776,287, Sep. 16, 1985, abandoned.

[30] Foreign Application Priority Data

Sep. 17, 1984 [JP] Japan .................................. 59-192460

[51] Int. Cl.[4] ............................................. B60K 15/06
[52] U.S. Cl. .................................... 280/5 H; 137/576; 180/219
[58] Field of Search ............... 280/5 A, 5 H; 180/219, 180/225; 137/571, 576; 220/20, 20.5, DIG. 25

[56] References Cited

U.S. PATENT DOCUMENTS

| | | | |
|---|---|---|---|
| 3,881,457 | 5/1975 | Benner et al. | 220/20 X |
| 4,385,676 | 5/1983 | Yoshimura | 280/5 A X |
| 4,449,723 | 5/1984 | Shiratsuchi | 280/5 H |
| 4,492,250 | 1/1985 | Ohmori et al. | 280/5 H X |

FOREIGN PATENT DOCUMENTS 476774  5/1929  Fed. Rep. of Germany ........ 220/20

Primary Examiner—John J. Love
Assistant Examiner—Charles R. Watts
Attorney, Agent, or Firm—Armstrong, Nikaido, Marmelstein & Kubovcik

[57] ABSTRACT

The known fuel tank for straddled type vehicles that is formed to have an inverse U-shaped transverse cross-section with its lower section bifurcated into left and right branch portions so as to straddle a main pipe of the straddled type vehicle from the above, is improved in that at least one of the rear bottom surface and the front bottom surface of either one of the lower bifurcated branch portions of the fuel tank is formed in a slant surface inclined upwards toward the corresponding end of the fuel tank.

5 Claims, 8 Drawing Figures

FUEL TANK FOR STRADDLED TYPE VEHICLES

This application is a continuation of application Ser. No. 776,287 filed Sept. 16, 1985 now abandoned.

BACKGROUND OF THE INVENTION

1. Field of the Invention

The present invention relates to a fuel tank to be mounted on a straddled type vehicle, especially on a motorcycle.

2. Description of the Prior Art

Heretofore, in a motorcycle, a fuel tank was formed to have an inverse U-shaped transverse cross-section with its lower section bifurcated, because the fuel tank was mounted on a vehicle body in such manner that the fuel tank may straddle a main pipe connected to an upper portion of a head pipe from the above.

In such a fuel tank, although the fuel filled in both the left and right branch portions of the tank communicates with each other in the state of a high fuel level, if the fuel level becomes low, the fuel is separated as accommodated in the left and right branch portions, respectively, due to the central communicating portion being held at a high level so as to avoid the main pipe. Consequently, in the case where a fuel cock is provided in either one of the left and right branch portions, the fuel would mostly remain in the branch portion not provided with the fuel cock, and hence the practical capacity of the fuel tank would be reduced. Even if the fuel should flow into the branch portion on the opposite side, that is, into the branch portion provided with the fuel cock due to tilting of the vehicle body or the like, the amount of the transfered fuel would be limited.

If the depths of the left and right branch portions are made shallow in order to avoid this shortcoming, then the level of the main frame is lowered, and hence the arrangement of the engine and the rear cushion would be restrained. Or, if the lower parts of the left and right branch portions are cut away, then the tank capacity would be reduced, and moreover, design of the appearance is limited. Furtheremore, if fuel cocks are provided in both the left and right branch portions, then when one is going to interrupt a fuel passageway, the driver may possibly forget to close either one of the left and right cocks. In addition, upon mounting and dismounting the fuel tank, the work of connecting and disconnecting the fuel pipes would become troublesome.

SUMMARY OF THE INVENTION

It is therefore one object of the present invention to provide an improved fuel tank for straddled type vehicles which is free from the above-mentioned shortcomings of the fuel tank in the prior art.

A more specific object of the present invention is to provide a fuel tank having an inverse U-shaped transverse cross-section so as to be available for straddled type vehicles, in which the fuel accommodated in the respective branch portions can be effectively consumed and hence the practical capacity of the fuel tank would not be reduced effectively.

According to one feature of the present invention, there is provided a fuel tank for straddled type vehicles that is formed to have an inverse U-shaped transverse cross-section with its lower section bifurcated into left and right branch portions so as to straddle a main pipe of the straddled type vehicle from the above, within which at least a portion of the surface at one end portion of the bottom surface of either one of the lower bifurcated branch portions of the tank is formed in a slant surface inclined upwards toward the corresponding end of the tank.

According to the present invention, due to the provision of the slant surface within either one of the lower bifurcated branch portions of the fuel tank, when the fuel level within the tank swings back and forth and hence the fuel flows back and forth due to acceleration, braking or vertical movement of the straddled type vehicle, the fuel located adjacent to the bottom surface of the bifurcated branch portion having the slant surface would be pushed up along the slant surface, hence it climbs over the ridge portion of the bottom surface of the fuel tank, and eventually it can flow into the other bifurcated branch portion not having the slant surface.

Therefore, even if a fuel cock is provided only in the bifurcated branch portion not having the slant surface, the fuel would not be left in the bifurcated branch portion on the opposite side, that is, in the branch portion having the slant surface, but the fuel accommodated in the respective branch portions can be effectively consumed without reducing the practical capacity of the fuel tank.

The above-mentioned and other objects, features and advantages of the present invention will become more apparent by reference to the following description of preferred embodiments of the invention taken in conjunction with the accompanying drawings.

DESCRIPTION OF THE PREFERRED EMBODIMENTS

Figure 1:
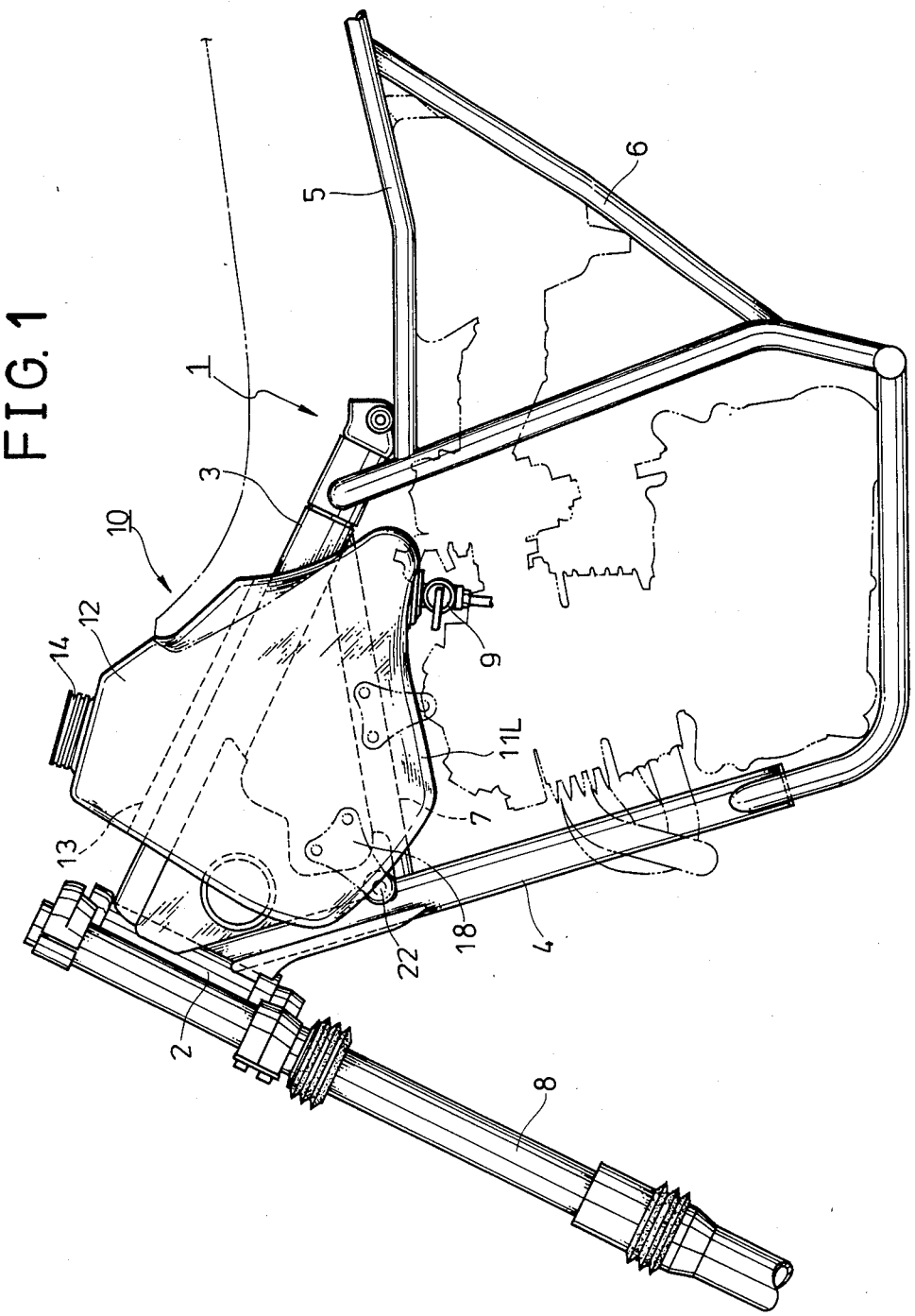
FIG. 1 is a schematic partial side view of an off-road type motorcycle on which a fuel tank according to the present invention is mounted.
Figure 2:
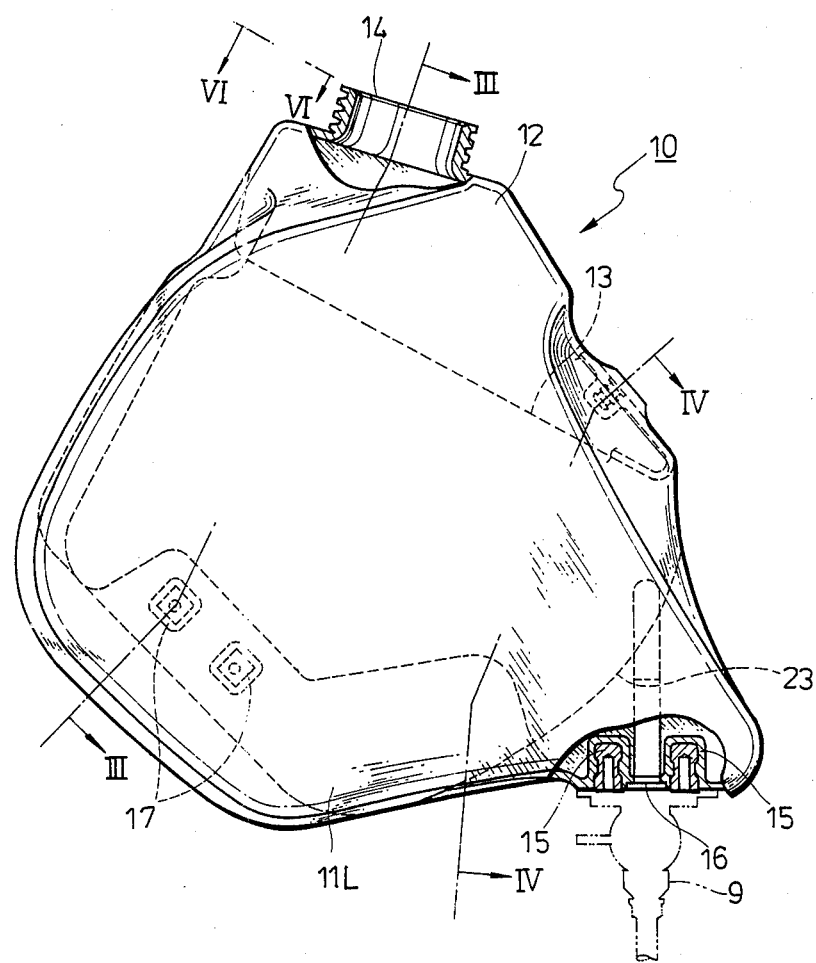
FIG. 2 is a side view partly cut away showing a fuel tank according to one preferred embodiment of the present invention, that is also illustrated in FIG. 1.

In the following, the present invention will be described in greater detail in connection to the preferred embodiments illustrated in FIGS. 1 to 8.

At first, referring to FIGS. 1 to 6, reference numeral 1 designates a vehicle body frame of an off-road type motorcycle. This vehicle body frame 1 is constructed of a head pipe 2, a main pipe 3 extending backwards from the head pipe 2, a pair of down tubes 4 projecting downwards from the head pipe 2 and further extending up to the rear end of the main pipe 3, side rails 5 integrally connected to the rear upper portions of the down tubes 4, back stays 6 integrally bridging the rear lower portions of the down tubes 4 and the side rails 5, and connecting members 7 having their opposite ends connected to the rear end of the main pipe 3 and the front upper portions of the down tubes 4.

Figure 3:
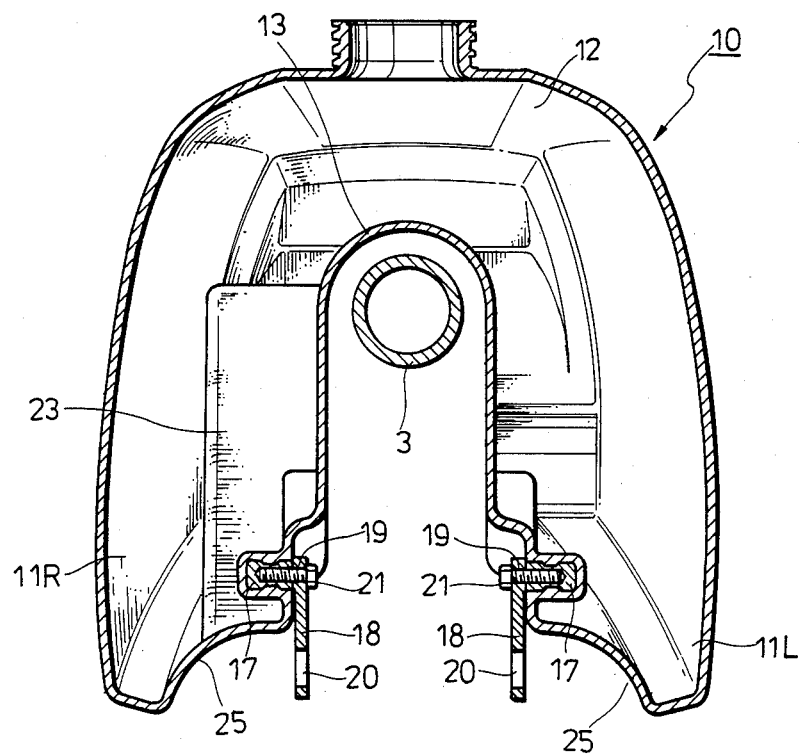
FIG. 3 is a transverse cross-section front view of the same fuel tank taken along line III—III in FIG. 2.
Figure 4:
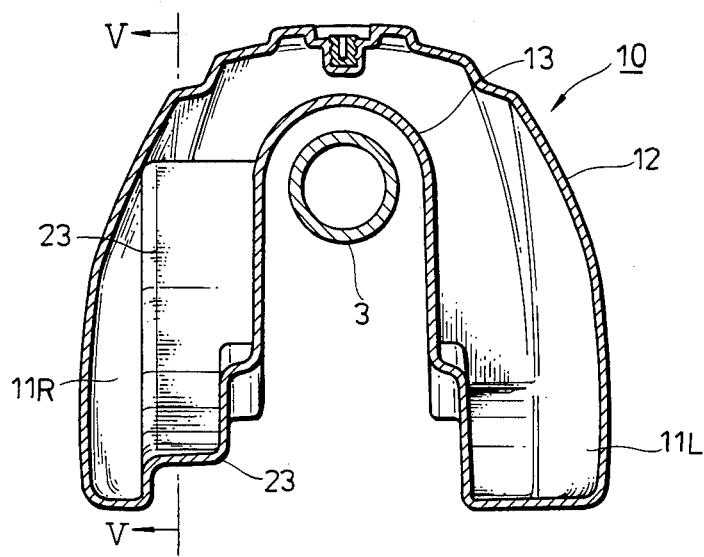
FIG. 4 is another transverse cross-section front view of the same fuel tank taken along line IV—IV in FIG. 2.
Figure 5:
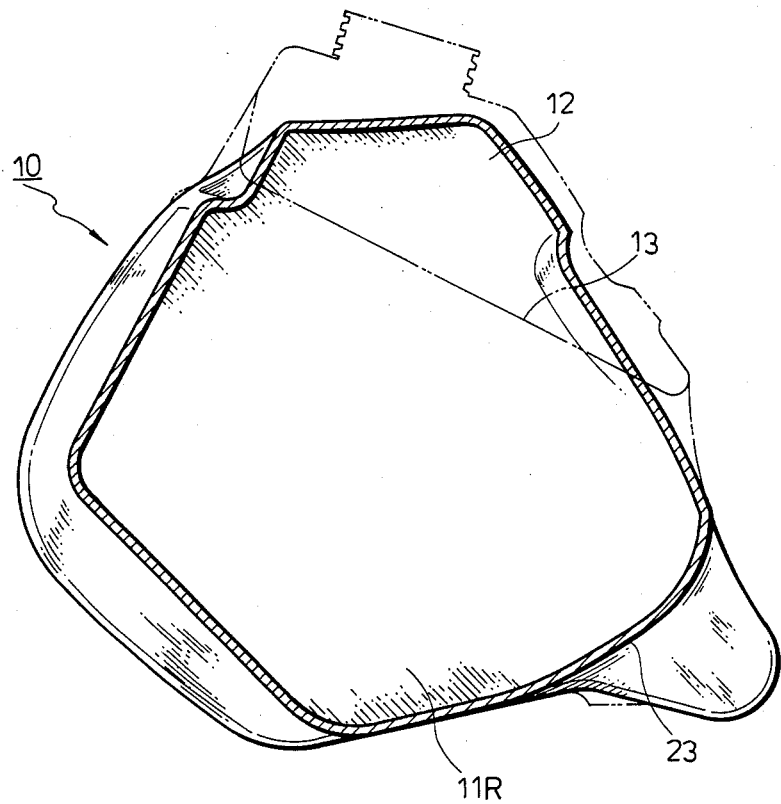
FIG. 5 is a longitudinal cross-section view of the same fuel tank taken along line V—V in FIG. 4.

In the illustrated embodiment, a fuel tank 10 is made of synthetic resin for the purpose of reducing its weight, and its transverse cross-section is formed in an inverse U-shape because it is mounted to the vehicle body frame 1 as straddling the main pipe 3 as shown in FIGS. 3 and 4.

A pouring port 14 is formed at the top of the fuel tank 10 and a cap not shown is to be detachably fitted to the pouring port 14. In addition, in the illustrated example, two nuts 15 for mounting a fuel cock are integrally buried in the tank wall of a left (as viewed from a rider) lower portion 11L of the fuel tank 10 as aligned back and forth, and a fuel delivery hole 16 is formed in the tank wall portion between the nuts 15. Thus, a fuel cock 9 is to be mounted to the fuel tank 10 by threadedly mating screws not shown with the nuts 15 under the state where a fuel passageway of the fuel cock 9 is communicated with the fuel delivery hole 16.

Still further, nuts 17 are buried in the front inside walls of the respective lower portions 11L and 11R of the fuel tank 10 as spaced back and forth at a predetermined interval, and upper portions of connecting plates 18 are connected with the lower portions 11L and 11R of the fuel tank 10 by threadedly mating bolts 21 with the aforementioned nuts 17 as penetrating through upper holes 19 in the connecting plates 18. In addition, a bolt 22 is extended through lower holes 20 in the connecting plates 18 and mount holes (not shown) formed at the joint portions between the front upper portions of the down tubes 4 and the connecting members 7, and threadedly mated with a nut not shown, and thereby the lower portions of the connecting plates 18 can be connected to the vehicle body frame 1.

In the lower portion 11R on the right side of the fuel tank 10 (on the left side as viewed in FIGS. 3 and 4) is formed a fuel guide surface 23 that is positioned inside of the fuel tank 10 and gradually inclined in the rear upward direction from the bottom to the rear end, and so, the capacity of the right side lower portion 11R of the fuel tank 10 is reduced by the amount corresponding to the formation of the fuel guide surface 23 as compared to the capacity of the left side lower portion 11L of the fuel tank 10.

Figure 6:
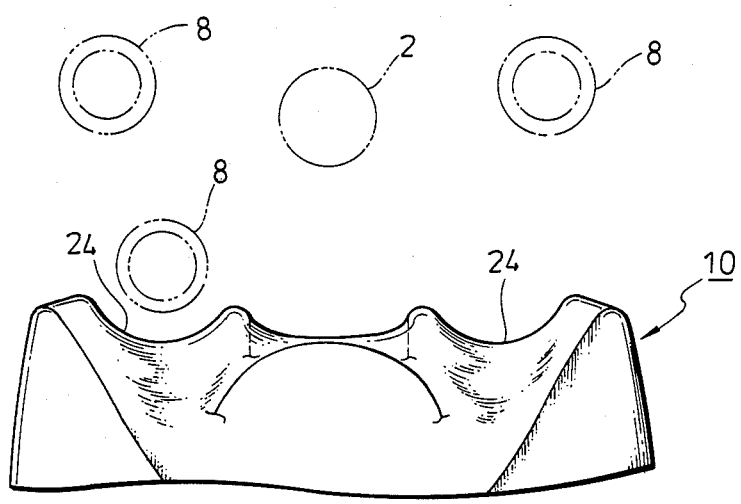
FIG. 6 is a schematic cross view taken along line VI—VI in FIG. 2 as viewed in the direction of arrows.

As shown in FIG. 6, on the front surface of the fuel tank 10 are formed fork escaping recesses 24 along the respective side edges so that front forks 8 may not come into contact with the fuel tank 10 when a front wheel is turned.

Furthermore, the left and right outside edge portions of the fuel tank 10 project along the front and bottom surfaces to form air guide sections 25 having depressed inside walls.

Since the fuel tank 10 illustrated in FIGS. 1 to 6 is constructed in the above-described manner, as the fuel is fed from the fuel delivery hole 16 through the cock 9 to an engine, the fuel level within the fuel tank 10 is gradually lowered, and after the fuel level has become lower than the lowest portion (the rearmost portion) of the tank ridge 13, only the fuel accommodated within the left side lower portion 11L of the fuel tank 10 is fed to the engine, and so, only the fuel level in the left side lower portion 11L would be lowered.

However, since the motorcycle is subjected to acceleration, deceleration and vertical movement during running, the fuel within the fuel tank 10 would swing back and forth and hence would flow back and forth, and when the fuel flows backwards, in the right side lower portion 11R of the fuel tank 10 the fuel would be pushed up as guided by the fuel guide surface 23 and would flow into the left side lower portion 11L of the fuel tank 10 as climbing over the ridge portion 13 of the fuel tank 10. Consequently, the fuel accommodated within the right side lower portion 11R of the fuel tank 10 can be transferred to its left side lower portion 11L without necessitating a pump or the like.

Moreover, since the fork escaping recesses 24 are formed on the front surface of the fuel tank 10, the fuel tank 10 can be disposed at a relatively front position, and so, the relative positioning of the fuel tank 10 can be arbitrarily set.

Furthermore, as the air guide sections 25 are formed along the front and bottom surfaces of the fuel tank 10, running wind would be guided to an engine right under the fuel tank 10, so that a heat radiating capability of the engine can be enhanced.

Figure 7:
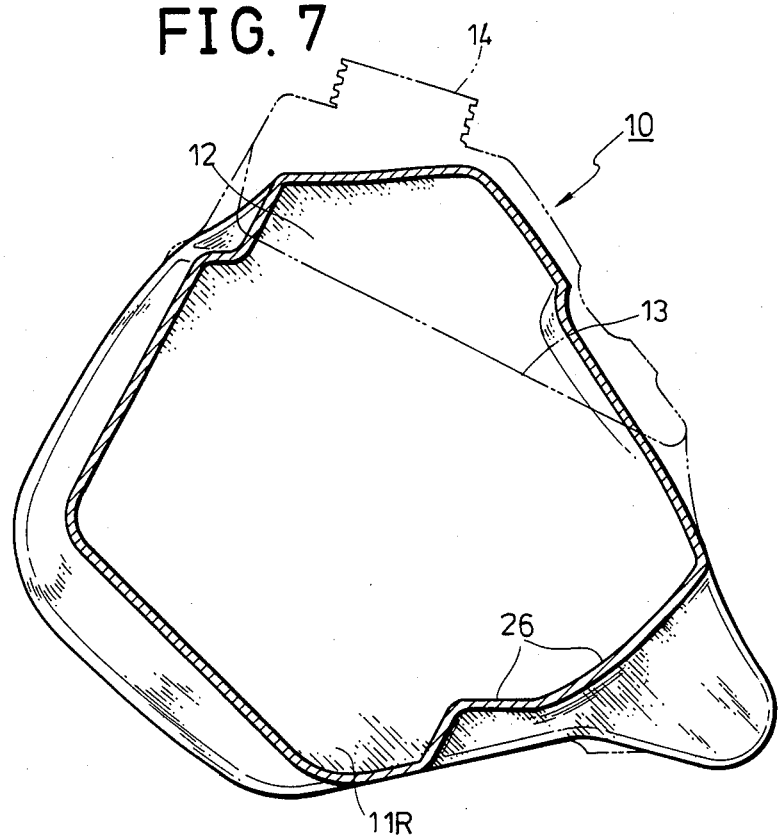
FIG. 7 is a longitudinal cross-section view of another preferred embodiment of the present invention.

While the fuel guide surface 23 was a smoothly curved surface in the embodiment illustrated in FIGS. 1 to 6, in a modified embodiment illustrated in FIG. 7 a fuel guide surface 26 consists of a lower slant surface portion contiguous to the bottom surface of the fuel tank, an upper slant surface portion and flat surface portion therebetween which is substantially parallel to the bottom surface of the fuel tank.

Alternatively, further modification could be made such that the outside surface of the right side lower portion 11R of the fuel tank 10 is formed similarly but symmetrically to that of the left side lower portion 11L of the fuel tank 10, and the bottom surface of the right side lower portion 11R of the fuel tank 10 is curved obliquely in the rear upward direction over its entire width.

Figure 8:
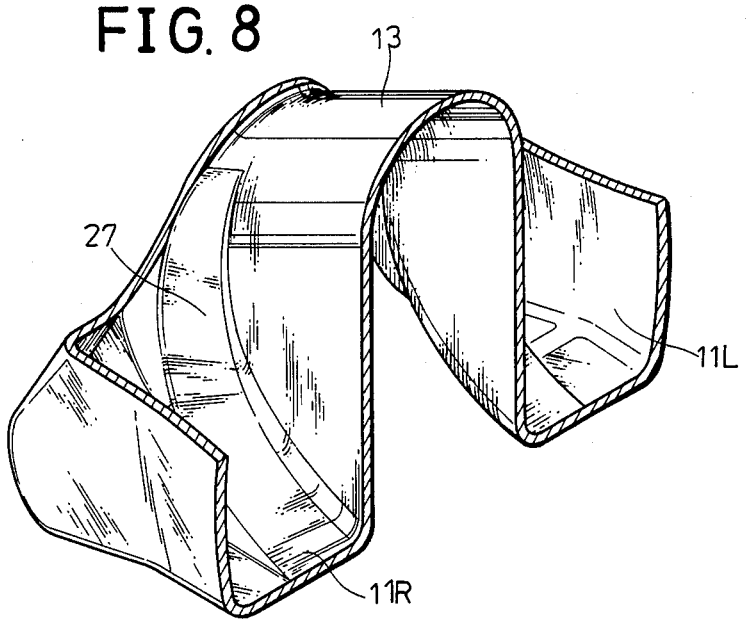
FIG. 8 is a perspective view showing still another preferred embodiment of the present invention.

Furthermore, as shown in FIG. 8, a fuel guide surface 27 could be twisted as it extends towards the end of the fuel tank 10 in such manner that the outside edge of the fuel guide surface 27 may be raised relative to the inside edge thereof. If the fuel guide surface is formed in such a shape, the transfer of fuel from the right side lower portion 11R of the fuel tank 10 to the left side lower portion 11L thereof can be further promoted.

According to the present invention, since the fuel can be transferred from the bifurcated branch portion of the fuel tank having the slant fuel guide surface formed therein to the other bifurcated branch portion not provided with the slant fuel guide surface during running of the vehicle, it is allowed to deliver the fuel from only the bifurcated branch portion in which the slant fuel guide surface is not formed. Hence, not only the structure can be simplified, but also a practical capacity of the fuel tank can be increased, the configuration and arrangement of the fuel tank can be arbitrarily designed. Moreover, the work of connecting and disconnecting a fuel pipe upon mounting and dismounting a fuel tank is simplified.

While the principle of the present invention has been described above in connection to preferred embodiments of the invention, as a matter of course, the invention should not be limited to the illustrated embodiments but many changes and modification in design could be made to the illustrated construction without departing from the spirit of the present invention.

What is claimed is:

1. A fuel tank for straddle type vehicles which is formed to have an inverse U-shaped transverse cross-section with downwardly extending legs of said U- shaped section bifurcated into left and right branch portions and straddling a main pipe of said straddle type vehicle, said tank having a top surface and front, rear and bottom surfaces; at least a portion of the bottom surface at one end portion of the surface of one of said downwardly extending legs of said fuel tank slants upwardly forming a slanted fuel guide surface toward a corresponding top surface of said fuel tank and rear and front portions of the bottom surface of the other of said downwardly extending legs is substantially flat.

2. A fuel tank for straddle type vehicles as claimed in claim 1, characterized in that a fuel cock is connected to said other of said downwardly extending legs of said fuel tank.

3. A fuel tank fior straddled type vehicles as claimed in claim 1, characterized in that said fuel guide surface consists of a single smoothly curved surface.

4. A fuel tank for straddle type vehicles as claimed in claim 1, characterized in that said slant surface consists of a lower fuel guide surface portion, an upper slant surface portion and a flat surface portion therebetween which is substantially parallel to the bottom surface of said other of said downwardly extending legs.

5. A fuel tank for straddle type vehicles as claimed in claim 1, wherein said fuel guide surface is twisted as it extends toward the top of said fuel tank in such a manner that one edge of said fuel guide surface may be raised relative to another edge thereof.

* * * * *